(12) United States Patent
Lin et al.

(10) Patent No.: US 11,342,657 B2
(45) Date of Patent: May 24, 2022

(54) ANTENNA DEVICE

(71) Applicant: Innolux Corporation, Miao-Li County (TW)

(72) Inventors: Yi Hung Lin, Miao-Li County (TW); Chung-Kuang Wei, Miao-Li County (TW); Tang Chin Hung, Miao-Li County (TW); I-Yin Li, Miao-Li County (TW); Chia-Chi Ho, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 16/932,862

(22) Filed: Jul. 20, 2020

(65) Prior Publication Data

US 2021/0050657 A1  Feb. 18, 2021

Related U.S. Application Data

(60) Provisional application No. 62/885,351, filed on Aug. 12, 2019.

(30) Foreign Application Priority Data

May 25, 2020 (CN) .......................... 202010450248.3

(51) Int. Cl.
*H01Q 1/38* (2006.01)
*H01Q 1/40* (2006.01)

(52) U.S. Cl.
CPC ................. *H01Q 1/38* (2013.01); *H01Q 1/40* (2013.01)

(58) Field of Classification Search
CPC ... H01Q 1/38; H01Q 1/40; H01Q 3/44; G02F 1/133
See application file for complete search history.

(56) References Cited

U.S. PATENT DOCUMENTS

2016/0261042 A1* 9/2016 Sazegar ............... H01Q 21/065
2018/0358690 A1  12/2018 Linn et al.

FOREIGN PATENT DOCUMENTS

| CN | 109690870 | 4/2019 |
|---|---|---|
| EP | 2768072 | 8/2014 |
| EP | 3419111 | 12/2018 |

OTHER PUBLICATIONS

"Search Report of Europe Counterpart Application", dated Jan. 27, 2021, p. 1-p. 8.

* cited by examiner

*Primary Examiner* — Seung H Lee
(74) *Attorney, Agent, or Firm* — JCIPRNET

(57) ABSTRACT

An antenna device is provided, including a first substrate, a first conductive element, a second substrate, a second conductive element, and an insulating layer. The first conductive element is disposed on the first substrate to define, on the first substrate, a recessed region adjacent to the first conductive element. The second substrate faces the first substrate. The second conductive element is disposed on the second substrate and located between the first substrate and the second substrate. The insulating layer is disposed between the first substrate and the second substrate. In a top view of the antenna device, the second conductive element overlaps the first conductive element and the recessed region, and the insulating layer at least partially overlaps the recessed region.

12 Claims, 7 Drawing Sheets

ANTENNA DEVICE

CROSS-REFERENCE TO RELATED APPLICATION

This application claims the priority benefits of U.S. provisional application Ser. No. 62/885,351, filed on Aug. 12, 2019, and China application serial no. 202010450248.3, filed on May 25, 2020. The entirety of each of the above-mentioned patent applications is hereby incorporated by reference herein and made a part of this specification.

BACKGROUND OF THE DISCLOSURE

1. Field of the Disclosure

The disclosure relates to an electronic device, and in particular, to an antenna device.

2. Description of Related Art

An antenna device is an indispensable part in wireless communication technologies. In a wireless communications apparatus by using a liquid crystal antenna, a liquid crystal material is filled between two layers of conductive elements. However, the liquid crystal material expands when hot and shrinks when cold. The more the liquid crystal material is filled, the greater the thermal expansion and cold shrink, and the greater the degree to which antenna performance is affected by temperature.

SUMMARY OF THE DISCLOSURE

According to embodiments of the disclosure, an antenna device is provided, including a first substrate, a first conductive element, a second substrate, a second conductive element, and an insulating layer. The first conductive element is disposed on the first substrate to define, on the first substrate, a recessed region adjacent to the first conductive element. The second substrate faces the first substrate. The second conductive element is disposed on the second substrate and located between the first substrate and the second substrate. The insulating layer is disposed between the first substrate and the second substrate. In a top view of the antenna device, the second conductive element overlaps the first conductive element and the recessed region, and the insulating layer at least partially overlaps the recessed region.

To make the features and advantages of the disclosure clear and easy to understand, the following gives a detailed description of embodiments with reference to accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
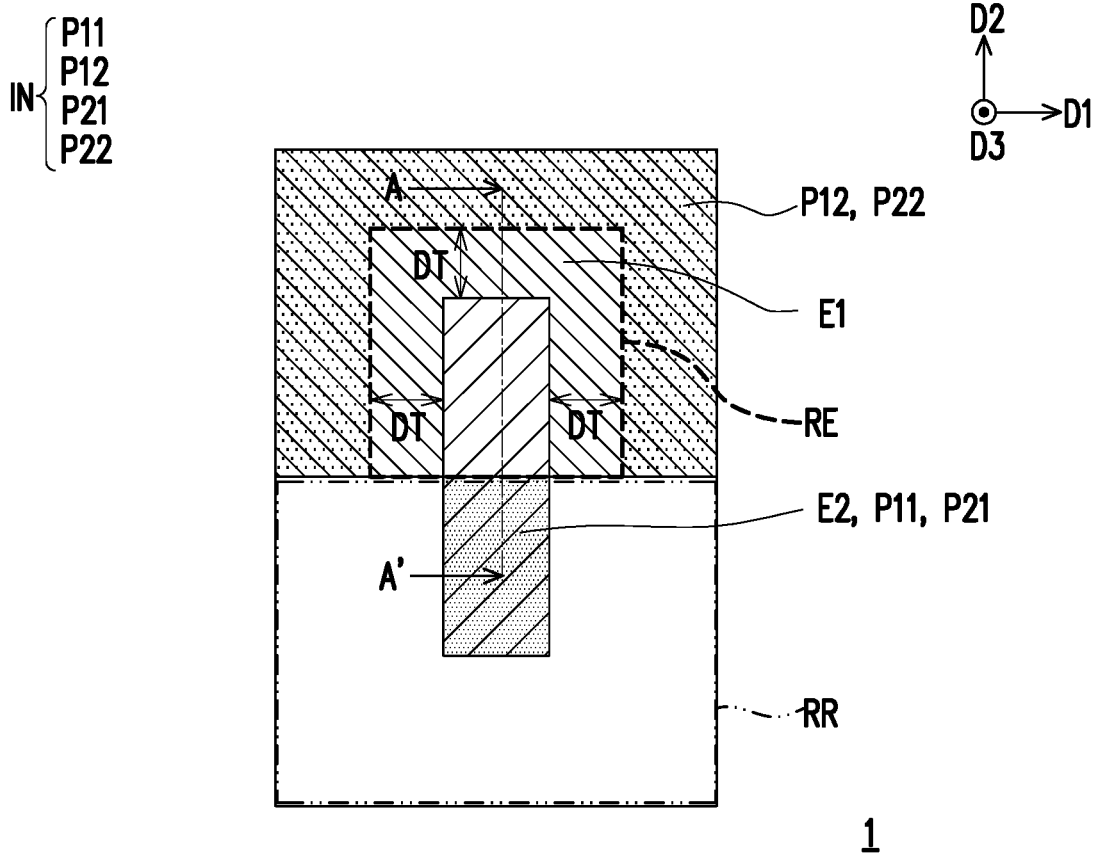
FIG. 1 is a schematic partial top view of an antenna device according to a first embodiment of the disclosure.

The disclosure may be understood with reference to the following detailed description and the accompanying drawings. It should be noted that, for ease of understanding by readers and concise drawings, a plurality of accompanying drawings in the disclosure merely show a part of an electronic device or a display device, and specific elements in the accompanying drawings are not drawn to scale. In addition, the quantity and size of the elements in the drawings are merely exemplary, and are not intended to limit the scope of the disclosure. For example, the relative sizes, thicknesses and positions of films, regions or structures may be reduced or enlarged for clarity.

Some words are used to refer to specific elements in the whole specification and the appended claims in the disclosure. A person skilled in the art should understand that an electronic device manufacturer may use different names to refer to the same elements. This specification is not intended to distinguish elements that have the same functions but different names. In this specification and the claims, words such as "have" and "include/comprise" are open words, and should be interpreted as "including, but not limited to".

The directional terms mentioned herein, like "above", "below", "front", "back", "left", or "right", refer to the directions in the accompanying drawings. Therefore, the directional terms are only used for illustration instead of limiting the disclosure. It should be understood that, when an element or a film is referred to as being "on" another element or film or "connected to" another element or film, the element or film may be directly on the another element or film or directly connected to the another element or film, or there is an element or a film (indirectly connected) inserted between the two elements or films. Conversely, when an element or a film is referred to as being "directly on" another element or film or "directly connected to" another element or film, there is no element or film inserted between the two elements or films.

The term "approximately", "equal to", "the same as", "substantially" or "roughly" referred to herein generally represents falling within 10% of a given value, or represents falling within 5%, 3%, 2%, 1% or 0.5% of a given value. In addition, unless otherwise specified, phrases "a given range is a first value to a second value" and "a given value falls within a range of a first value to a second value" both mean that the given range includes the first value, the second value, and other values between the first value and the second value.

In some embodiments of the disclosure, terms such as "connect" and "interconnect" with regard to bonding and connection, unless specifically defined, may mean that two structures are in direct contact, or may mean that two structures are not in direct contact, and there is another structure between the two structures. The terms with regard to bonding and connection may also include a case where both structures are movable or both structures are fixed. In addition, the terms "electrical connection" and "coupling" include any direct and indirect means of electrical connection.

In the following embodiments, same or similar reference numerals are used to indicate same or similar elements, and details may be omitted in the description. In addition, the features in the embodiments may be used in any combination without departing from the spirit of the disclosure or conflicting with each other, and simple equivalent changes and modifications made to the specification or the claims shall still fall within the scope of the disclosure. In addition, the terms "first", "second", and the like mentioned in the specification or the claims are used only to name different elements or to distinguish between different embodiments or ranges, but are not intended to define the upper or lower limit of the number of elements or the manufacturing or arrangement order of the elements.

The electronic device of the disclosure may include an antenna device or an electronic device with an antenna, but is not limited thereto. The electronic device may include a bendable or flexible electronic device. The antenna device is used as the electronic device in the following to explain content of the disclosure, but the disclosure is not limited thereto.

Figure 2:
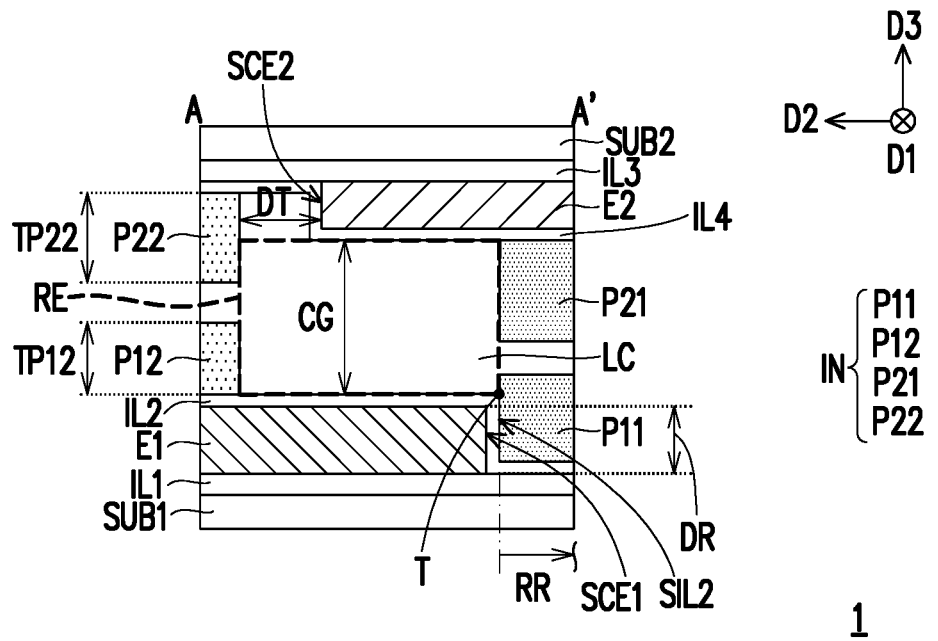
FIG. 2 is a schematic sectional view taken along a line A-A' in FIG. 1.
Figure 3:
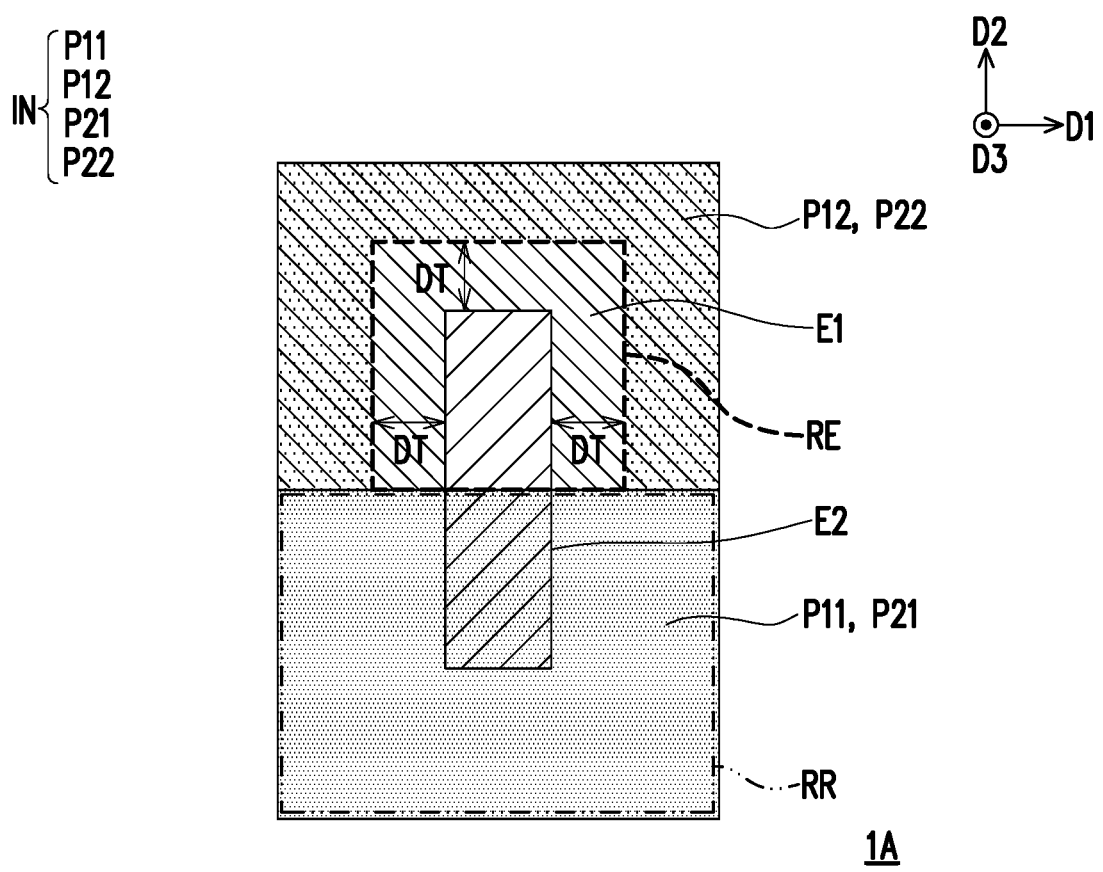
FIG. 3 is a schematic partial top view of an antenna device according to a second embodiment of the disclosure.
Figure 4:
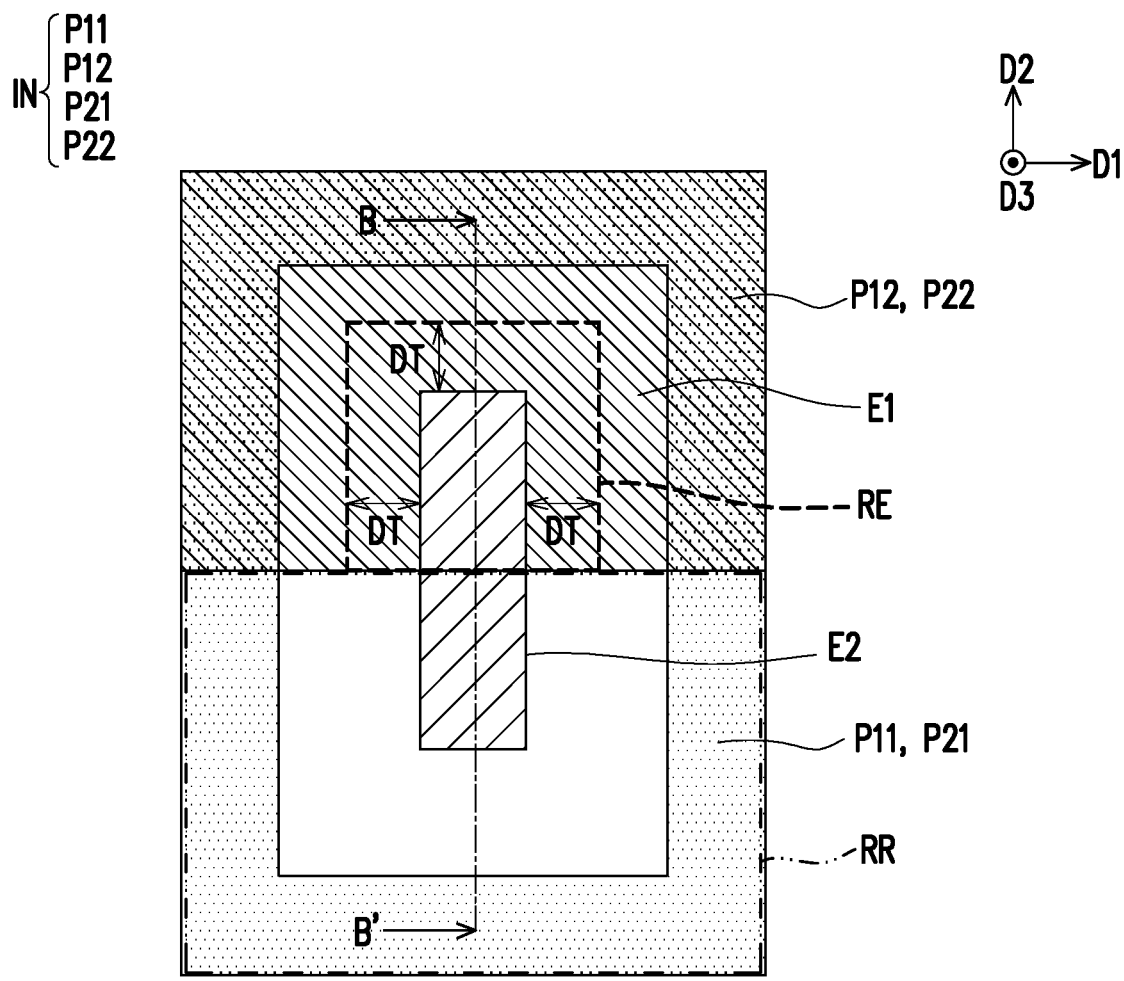
FIG. 4 is a schematic partial top view of an antenna device according to a third embodiment of the disclosure.
Figure 5:
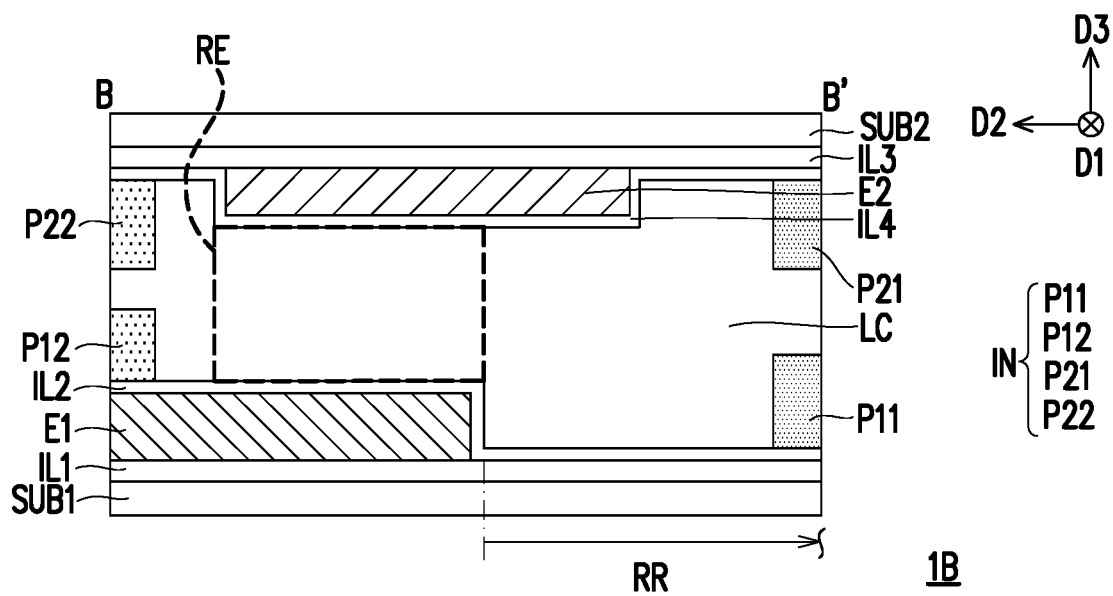
FIG. 5 is a schematic sectional view taken along a line B-B' in FIG. 4.

FIG. 1 is a schematic partial top view of an antenna device according to a first embodiment of the disclosure. FIG. 2 is a schematic sectional view taken along a line A-A' in FIG. 1. FIG. 3 is a schematic partial top view of an antenna device according to a second embodiment of the disclosure. FIG. 4 is a schematic partial top view of an antenna device according to a third embodiment of the disclosure. FIG. 5 is a schematic sectional view taken along a line B-B' in FIG. 4. FIG. 6 to FIG. 9 are schematic partial top views of an antenna device according to a fourth embodiment and of an antenna device according to a seventh embodiment of the disclosure.

In the drawings, in order to clearly show a relative disposing relationship of elements, each schematic partial top view only schematically shows one antenna unit. However, the antenna device may include a plurality of antenna units. The plurality of antenna units may be arranged in an array along a first direction D1 and a second direction D2, but the disclosure is not limited thereto. The first direction D1 and the second direction D2 are perpendicular to a normal direction D3 of the antenna device, and the first direction D1 and the second direction D2 intersect each other, for example, being perpendicular to each other, but is not limited thereto. A shape, a number, or an arrangement manner of the antenna units in the antenna device may be changed according to requirements, and the descriptions thereof are omitted herein.

Referring to FIG. 1 and FIG. 2, an antenna device 1 may include a first substrate SUB1, a first conductive element E1, a second substrate SUB2, a second conductive element E2, a liquid crystal layer LC, and an insulating layer IN.

The first substrate SUB1 is configured to support an element or a film layer. For example, a material of the first substrate SUB1 may include plastic or glass, but is not limited thereto.

The first conductive element E1 is disposed on the first substrate SUB1. A material of the first conductive element E1 may include a light-transmissive conductive material, an opaque conductive material, or a combination of the two. The light-transmissive conductive material may include a metal oxide, but is not limited thereto. The opaque conductive material may include a metal, an alloy, or a combination of the two, but is not limited thereto.

The first conductive element E1 defines, on the first substrate SUB1, a recessed region RR adjacent to the first conductive element E1. More particular, the first conductive element E1 has a maximum thickness DR in a normal direction D3 of the first substrate SUB1. FIG. 1 schematically shows that the recessed region RR is a region outside the first conductive element E1 in an antenna unit, but a range of the recessed region RR may be changed according to actual design, and is not limited thereto.

In some embodiments, the antenna device 1 may further include, but not limited to, an insulating film IL1 and an insulating film IL2. The insulating film IL1 is disposed on the first substrate SUB1 and is located between the first conductive element E1 and the first substrate SUB1. The insulating film IL2 is disposed on the first conductive element E1 and covers a side wall surface SCE1 of the first conductive element E1. According to different requirements, a manner in which the insulating film IL1 and the insulating film IL2 is disposed may also be changed. For example, the insulating film IL2 may be further disposed on the insulating film IL1 not covered by the first conductive element E1. Or, alternatively, the insulating film IL1 is not disposed on the first substrate SUB1. Instead, an upper surface of the first conductive element E1, a side wall surface SCE1 of the first conductive element E1, and an upper surface of the recessed region RR are covered by the insulating film IL2, but the disclosure is not limited thereto. The insulating film IL1 and/or the insulating film IL2 may be a single insulating layer or a stacked layer of a plurality of insulating layers. For example, materials of the insulating film IL1 and the insulating film IL2 may include an organic insulating material, an inorganic insulating material, or a combination of the two, but is not limited thereto.

As shown in FIG. 2, in a case where the insulating film IL2 is disposed, an outer surface SIL2 of the insulating film IL2 covering the side wall surface SCE1 of the first conductive element E1 can be used as an edge of the recessed region RR adjacent to the first conductive element E1. In FIG. 2, the side wall surface SCE1 of the first conductive element E1 is schematically shown as a vertical plane perpendicular to the first substrate SUB1, and an outer surface SIL2 of the insulating film IL2 formed on the side wall surface SCE1 of the first conductive element E1 is also a vertical plane perpendicular to the first substrate SUB1. However, depending on different manufacturing methods, materials, or other process parameters, the side wall surface SCE1 of the first conductive element E1 and the outer surface SIL2 of the insulating film IL2 may also be a slope surface or an arc surface. When the outer surface SIL2 of the insulating film IL2 is the slope surface or the arc surface, an uppermost edge T of the outer surface SIL2 may be defined as an edge of the recessed region RR.

The second substrate SUB2 faces the first substrate SUB1. A material of the second substrate SUB2 may include plastic or glass, but is not limited thereto.

The second conductive element E2 is disposed on the second substrate SUB2 and faces the first substrate SUB1. In other words, the second conductive element E2 is located between the second substrate SUB2 and the first substrate SUB1. A material of the second conductive element E2 may include a light-transmissive conductive material, an opaque conductive material, or a combination of the two. The light-transmissive conductive material may include a metal oxide, but is not limited thereto. The opaque conductive material may include a metal, an alloy, or a combination of the two, but is not limited thereto.

In a top view (FIG. 1) of the antenna device 1, the second conductive element E2 overlaps the first conductive element E1 and the recessed region RR. In other words, the second conductive element E2 overlaps the first conductive element E1 and the recessed region RR in a normal direction D3. FIG. 1 schematically shows that an upper half of the second conductive element E2 overlaps the first conductive element E1 in the normal direction D3, and a lower half of the second conductive element E2 overlaps the recessed region RR in the normal direction D3, but a relative disposing relationship or overlapping ratio of the second conductive element E2, the first conductive element E1, and the recessed region RR may be changed according to requirements, and is not limited to a relationship shown in FIG. 1.

The antenna device 1 includes an effective region RE. In the top view (FIG. 1) of the antenna device 1, the effective region RE overlaps the first conductive element E1 and the second conductive element E2. In addition, at least one edge of the effective region RE is separated from a corresponding edge of the second conductive element E2 by a distance DT. As shown in FIG. 2, an edge of the recessed region RR adjacent to the first conductive element E1 may be used as an edge of the effective region RE adjacent to the recessed region RR. More particular, in the top view, an edge of an overlapping region of the first conductive element E1 and the second conductive element E2 may be used as a reference. Except that a part overlapping the recessed region RR is not moved outwardly, remaining edges are moved outwardly respectively, as a boundary line of the effective region RE, by a distance DT along a direction parallel to a lower surface of the substrate. In this way, seen from a top view, a range of the effective region RE includes the overlapping region of the first conductive element E1 and the second conductive element E2, and a range obtained after the remaining edges are moved outwardly by the distance DT, as shown in FIG. 1. In addition, in the disclosure, the distance DT refers to a shortest distance between the edge of the effective region RE and an edge of a corresponding edge of the second conductive element E2. In some embodiments, the distance DT may fall within a range of 1 μm to 1000 μm, but is not limited thereto. In some embodiments, seen from the top view of the antenna device 1, a shape of the effective region RE may correspond to a shape of the overlapping region of the first conductive element E1 and the second conductive element E2. For example, in FIG. 1, the shape of the overlapping region of the first conductive element E1 and the second conductive element E2 and a shape of the effective region RE may be both a quadrangle, and an edge of the effective region RE is separated from a corresponding edge of the second conductive element E2 by a distance DT. According to different requirements, the shape of the overlapping region of the first conductive element E1 and the second conductive element E2 may also be a circle, an ellipse, or other shapes, and the shape of the effective region RE may be changed accordingly.

A liquid crystal layer LC is disposed between the first substrate SUB1 and the second substrate SUB2. For example, the liquid crystal layer LC may include twisted nematic liquid crystal (TN LC), vertical alignment liquid crystal (VA LC), and in-plane switching liquid crystal (IPS LC) or other types of liquid crystal.

As shown in FIG. 1 and FIG. 2, the insulating layer IN is disposed between the first substrate SUB1 and the second substrate SUB2. In the top view (FIG. 1) of the antenna device 1, the insulating layer IN is located outside the effective region RE, and at least a part (such as a sub-layer P11 and/or a sub-layer P21) of the insulating layer IN overlaps the recessed region RR. By means of the insulating layer IN, the use amount of a liquid crystal material can be reduced, or antenna performance can be less affected by temperature. In addition, the insulating layer IN is disposed outside the effective region RE, an influence on the antenna performance when the insulating layer IN is located in the effective region RE can be reduced, or occurrence of a side effect can be reduced. In this way, the antenna device 1 may have relatively stable performance.

The insulating layer IN may be a single insulating layer or multi-insulating layer. In addition, a material of the insulating layer IN may include an organic insulating material, an inorganic insulating material, or a combination of the two, but is not limited thereto. The insulating layer IN may include at least one first part (such as the sub-layer P11 and/or sub-layer P21) overlapping the recessed region RR. In other words, in the top view (FIG. 1) of the antenna device 1, the sub-layer P11 and/or the sub-layer P21 overlap the recessed region RR. In some embodiments, in the top view (FIG. 1) of the antenna device 1, the sub-layer P11 and/or the sub-layer P21 may overlap the second conductive element E2 (that is, the sub-layer P11 and/or the sub-layer P21 overlap the second conductive element E2 in a normal direction D3), and the sub-layer P11 and/or the sub-layer P21 does not exceed a range of the second conductive element E2 in the top view. In some embodiments, in the top view (FIG. 1) of the antenna device 1, the sub-layer P11 and the sub-layer P21 may have same or different design parameters (such as a shape or an area).

In some embodiments, the insulating layer IN may further include at least one second part (such as a sub-layer P12 and/or a sub-layer P22) that does not overlap the recessed region RR. In the top view (FIG. 1) of the antenna device 1, the sub-layer P12 and the sub-layer P22 overlap the first conductive element E1 and are located outside the effective region RE, that is, the sub-layer P12 and the sub-layer P22 overlap the first conductive element E1 in the normal direction D3 and does not overlap the effective region RE. In some embodiments, in the top view (FIG. 1) of the antenna device 1, the sub-layer P12 and the sub-layer P22 may have same or different design parameters (such as a shape or an area).

In addition, similar to the first substrate SUB1, the second substrate SUB2 may further include, but not limited to, an insulating film IL3 and an insulating film IL4. The insulating film IL3 is disposed on the second substrate SUB2 and is located between the second conductive element E2 and the second substrate SUB2. The insulating film IL4 is disposed on the second conductive element E2 and covers a side wall surface SCE2 of the second conductive element E2. According to different requirements, a manner in which the insulating film IL3 and the insulating film IL4 is disposed may also be changed. For example, the insulating film IL4 may be further disposed on the insulating film IL3 not covered by the second conductive element E2. Or, alternatively, the insulating film IL3 is not disposed on the second substrate SUB2. Instead, a surface and a side wall surface SCE2 of the second conductive element E2, and a surface that is of the second substrate SUB2 and that does not overlap the second conductive element E2 are covered by the insulating film IL4, but the disclosure is not limited thereto. The insulating film IL3 and the insulating film IL4 may be a single insulating layer or a stacked layer of a plurality of insulating layers. For example, materials of the insulating film IL3 and the insulating film IL4 may include an organic insulating material, an inorganic insulating material, or a combination of the two, but is not limited thereto.

In some embodiments, the first part (such as the sub-layer P11 or the sub-layer P21) and the second part (such as the sub-layer P12 or the sub-layer P22) may be both located on a same substrate. For example, the sub-layer P11 of the first part and the sub-layer P12 of the second part are similarly disposed on the first substrate SUB1. In some embodiments, the first part may be disposed on one of the first substrate SUB1 and the second substrate SUB2, and the second part may be disposed on the other one of the first substrate SUB1 and the second substrate SUB2. For example, the sub-layer P11 of the first part is disposed on the first substrate SUB1, and the sub-layer P22 of the second part is disposed on the second substrate SUB2. In some embodiments, there are two sub-layers for at least one of the first part (such as the sub-layer P11 and the sub-layer P21) and the second part (such as the sub-layer P12 and the sub-layer P22), and the two sub-layers are disposed on the first substrate SUB1 and the second substrate SUB2, respectively. For example, the sub-layer P12 and the sub-layer P22 of the second art are disposed on the first substrate SUB1 and the second substrate SUB2, respectively.

As shown in FIG. 2, the sub-layer P11 may be disposed on the insulating film IL2 located in the recessed region RR and between the liquid crystal layer LC and the insulating film IL2. The sub-layer P21 overlaps the sub-layer P11 in a normal direction D3, and the sub-layer P21 may be disposed on the insulating film IL4 and located between the liquid crystal layer LC and the insulating film IL4. In some embodiments, the antenna device may include only one of the sub-layer P11 or the sub-layer P21. In some embodiments, the antenna device may include both the sub-layer P11 and the sub-layer P21, and a gap is reserved between the sub-layer P11 and the sub-layer P21 to facilitate flow of liquid crystal. In some embodiments, the sub-layer P11 may be connected to the sub-layer P21.

Similarly, for example, the sub-layer P12 is disposed on the insulating film IL2 and is located between the liquid crystal layer LC and the insulating film IL2. The sub-layer P22 overlaps the sub-layer P12 in the normal direction D3, and the sub-layer P22 is, for example, disposed on the insulating film IL4 and between the liquid crystal layer LC and the insulating film IL4. Similarly, the antenna device may also include only one of the sub-layer P12 or the sub-layer P22. In some embodiments, the antenna device may include both the sub-layer P12 and the sub-layer P22, and a gap is reserved between the sub-layer P12 and the sub-layer P22 to facilitate flow of liquid crystal. In some embodiments, the sub-layer P12 may be connected to the sub-layer P22.

In some embodiments, the sub-layer P11 and the sub-layer P12 are both disposed on the first substrate SUB1, and the sub-layer P21 and the sub-layer P22 are both disposed on the second substrate SUB2. In some embodiments, the sub-layer P11 and the sub-layer P12 (or the sub-layer P21 and the sub-layer P22) may be formed simultaneously or successively. In some embodiments, a thickness of the second part (equivalent to a sum of a thickness TP12 of the sub-layer P12 and a thickness TP22 of the sub-layer P22) may be in a range of 10% to 95% of a thickness CG of the liquid crystal layer LC ($0.1\,CG<TP12+TP22<0.95\,CG$). It should be noted that in the disclosure, the thickness CG of the liquid crystal layer LC in the effective region RE is a shortest distance between the first conductive element E1 and the second conductive element E2 in the normal direction D3 (if the conductive elements E1 and E2 have an insulating film IL2 and an insulating film IL4, respectively, the thickness CG of the liquid crystal layer LC is a shortest distance between an upper surface of the insulating film IL2 and a lower surface of the insulating film IL4 in the normal direction D3). The thickness TP12 of the sub-layer P12 and the thickness TP22 of the sub-layer P22 are maximum thicknesses of the sub-layer P12 and the sub-layer P22 measured in the normal direction D3, respectively.

Referring to FIG. 3, a main difference between an antenna device 1A and the antenna device 1 of FIG. 1 is shown in the following. In the antenna device 1 of FIG. 1, the sub-layer P11 and the sub-layer P21 only correspond to a region in which the second conductive element E2 overlaps the recessed region RR; but in the antenna device 1A, at least one of a sub-layer P11 and a sub-layer P21 fully overlaps a recessed region RR. In other words, in a top view (FIG. 3) of the antenna device 1A, an area of the sub-layer P11 and/or the sub-layer P21 is approximately the same as an area of the recessed region RR.

A region in which an insulating layer IN is disposed is expanded or an area of the insulating layer IN is expanded. Thus, a use amount of a liquid crystal material can be reduced, or antenna performance can be less affected by temperature.

Referring to FIG. 4 and FIG. 5, a main difference between an antenna device 1B and the antenna device 1 of FIG. 1 is shown in the following. In a top view (FIG. 4) of the antenna device 1B, a second conductive element E2 and an effective region RE are surrounded by an insulating layer IN. More particular, the insulating layer IN (including a sub-layer P11, a sub-layer P21, a sub-layer P12, and a sub-layer P22) surrounds the second conductive element E2 and is located outside the effective region RE (a distance between the sub-layer P12 and/or the sub-layer P22 and the second conductive element E2 is greater than a distance DT). At least one part of the insulating layer IN is filled in the recessed region RR, and the insulating layer IN does not overlap the effective region RE in a normal direction D3. In some embodiments, another part of the insulating layer IN may be disposed under the second conductive element E2 and located in a region in which the second conductive element E2 overlaps the recessed region RR. The insulating layer IN is disposed outside the effective region RE to further reduce an influence of the insulating layer IN on antenna performance or occurrence of a side effect.

Figure 6:
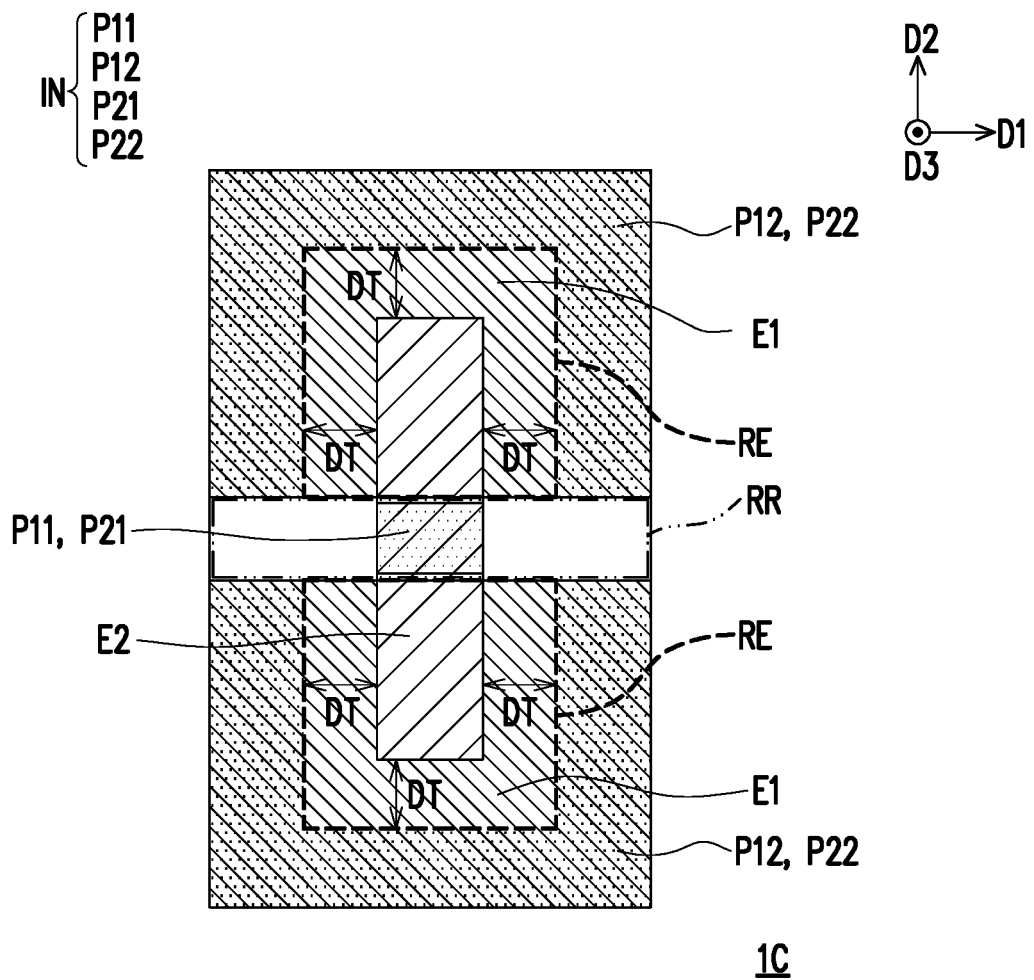
FIG. 6 to FIG. 9 are schematic partial top views of an antenna device according to a fourth embodiment and of an antenna device according to a seventh embodiment of the disclosure.
Figure 7:
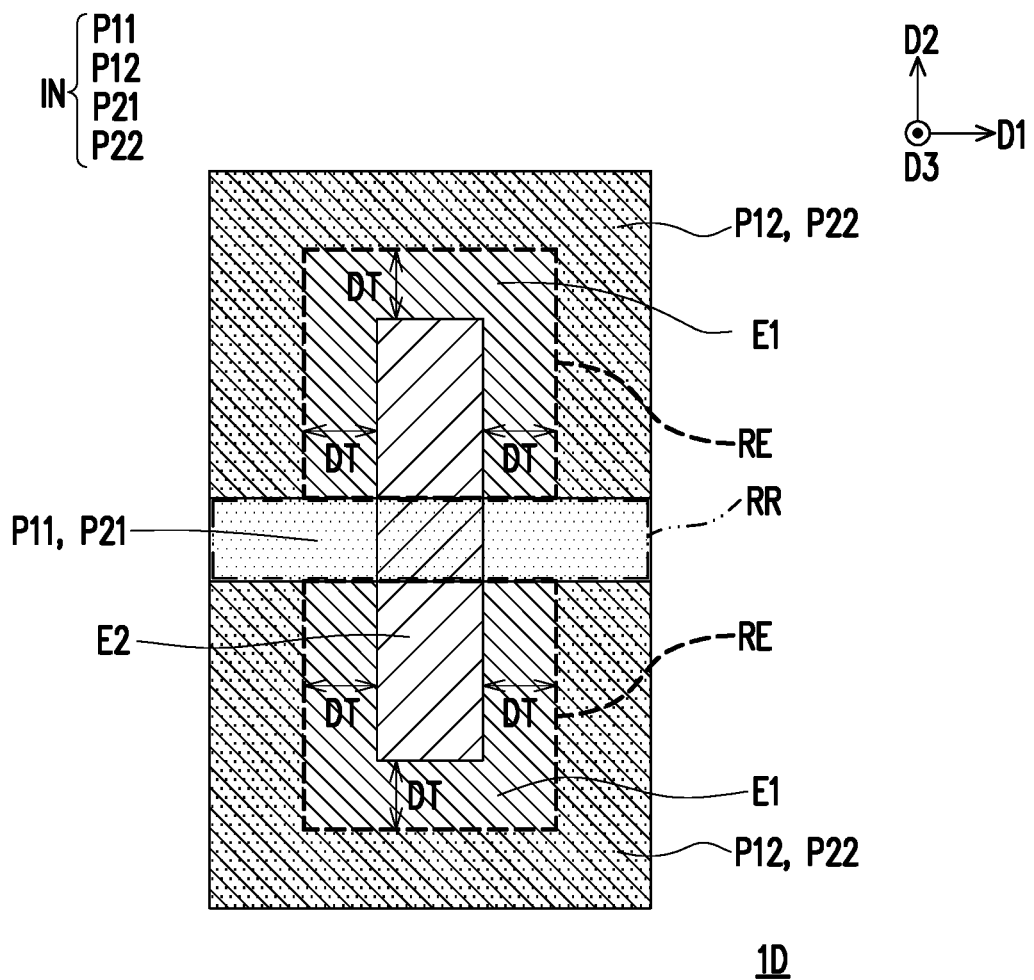

Referring to FIG. 6 and FIG. 7, a main difference between an antenna device 1C (or an antenna device 1D) in FIG. 6 and the antenna device 1 in FIG. 1 is shown in the following. In an antenna unit of the antenna device 1C (or the antenna device 1D), a first conductive element E1 is disposed on both sides of a recessed region RR, and a second conductive element E2 extends in a second direction D2 and transverses a recessed region RR. A sub-layer P12 and/or a sub-layer P22 of an insulating layer IN are located above the first conductive element E1. In the antenna unit of the antenna device 1C, a sub-layer P11 and/or a sub-layer P21 are located in the recessed region RR and overlap the second conductive element E2 in a top view. In an antenna unit of the antenna device 1D of FIG. 7, at least one of a sub-layer P11 and a sub-layer P21 fully covers a recessed region RR. In other words, in a top view of some embodiments, an area of the sub-layer P11 (or sub-layer P21) of the antenna device 1D is approximately the same as an area of the recessed region RR.

Figure 8:
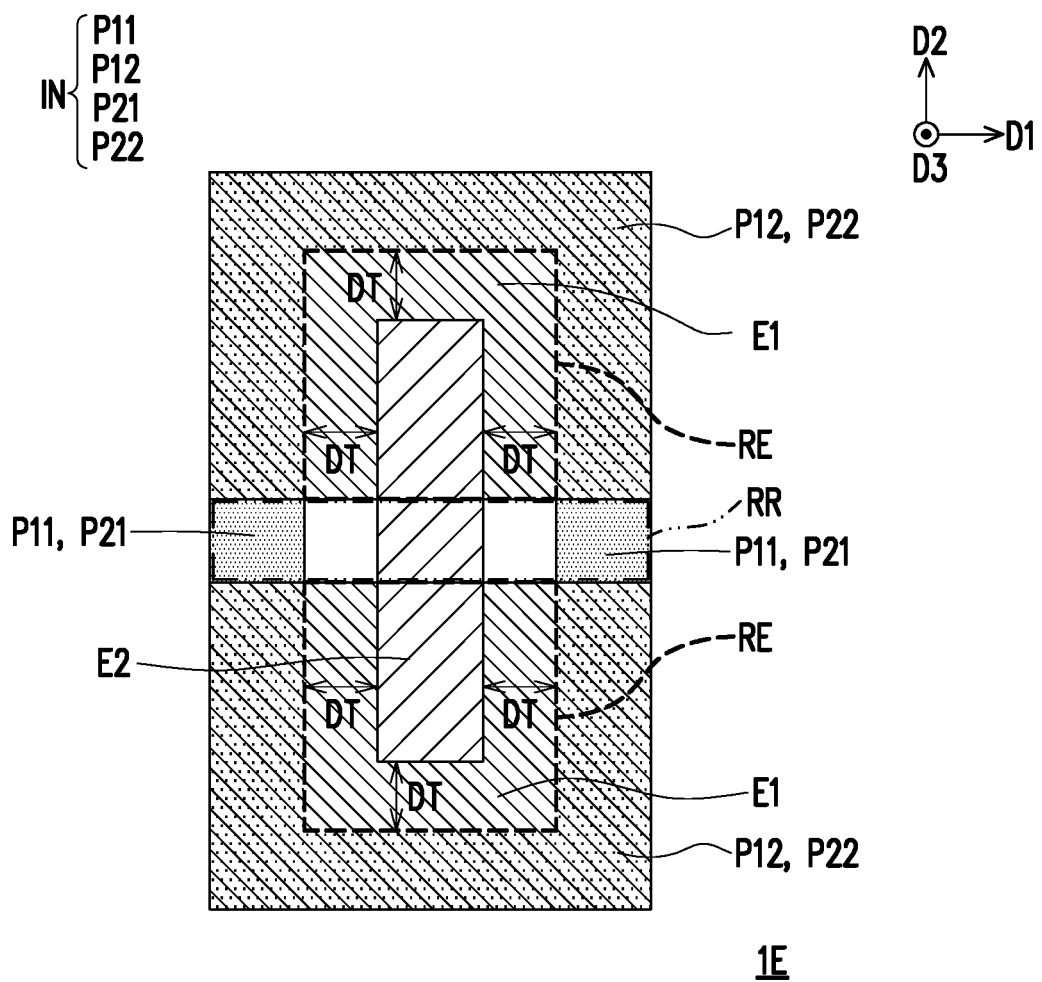

Referring to FIG. 8, a main difference between an antenna device 1E and the antenna device 1C of FIG. 6 is shown in the following. In the antenna device 1E, a second conductive element E2 and an effective region RE are surrounded by an insulating layer IN. A sub-layer P12 and/or the sub-layer P22 are located above a first conductive element E1 on both sides of a recessed region RR, and two sub-layers P11 and/or two sub-layers P21 are located at two opposite ends of the recessed region RR in the first direction D1, respectively, but do not completely cover the recessed region RR. More particular, the sub-layer P12 and the sub-layer P22 of the insulating layer IN are adjacent to the effective region RE, and do not overlap the effective region RE in a normal direction D3. In some embodiments, seen from a top view, the sub-layer P12 and/or the sub-layer P22 may be generally modified to be away from the second conductive element E2 by a distance greater than DT shown in FIG. 4, and a distance greater than the distance DT may be similarly kept between the sub-layer P11 and/or the sub-layer P21 and the second conductive element E2.

Figure 9:
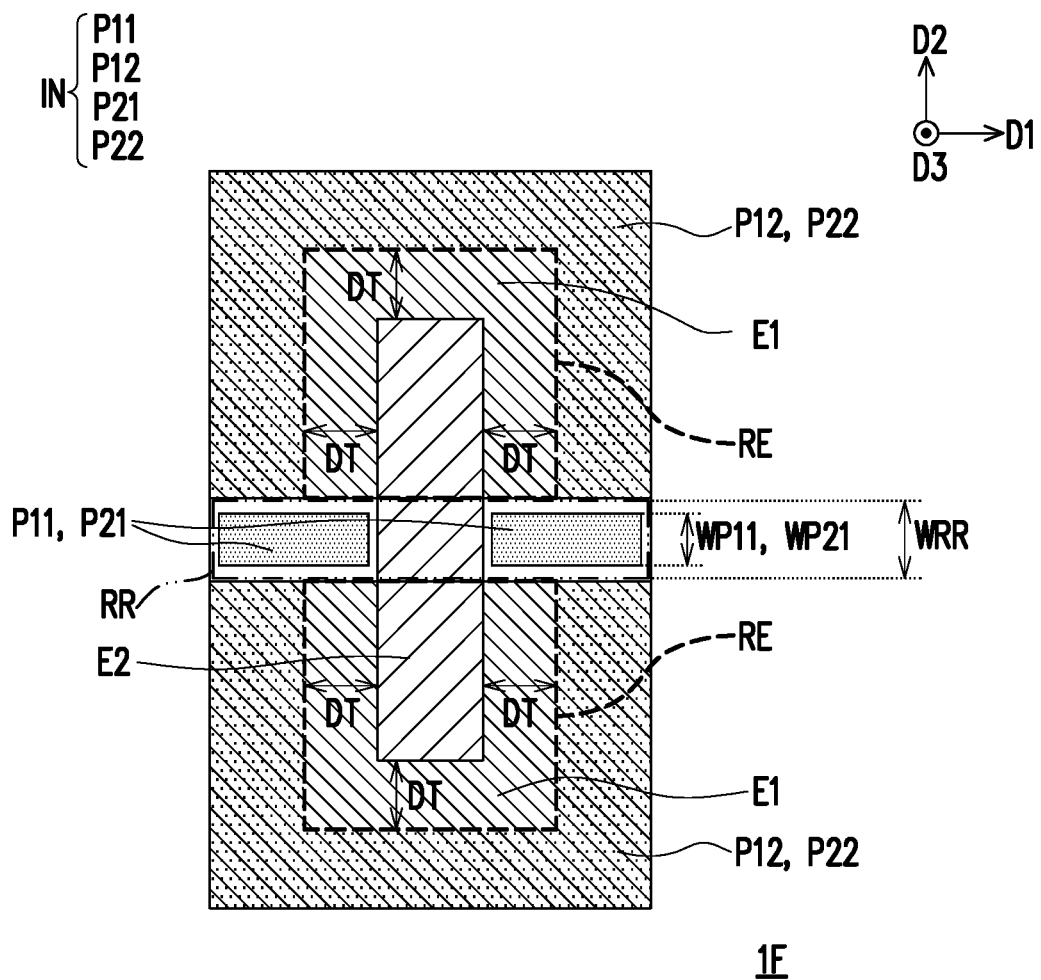

Referring to FIG. 9, a main difference between an antenna device 1F and the antenna device 1E of FIG. 8 is shown in the following. In the antenna device 1F, a sub-layer P11 and/or a sub-layer P21 overlap a recessed region RR in a normal direction D3, and a width WP11 of the sub-layer P11 in a second direction D2 and/or a width WP21 of the sub-layer P21 in the second direction D2 are greater than 0 and smaller than a width WRR of the recessed region RR in the second direction D2 (0<sub-layer width <WRR), respectively. It should be noted that the width WP11 of the sub-layer P11 and the width WP21 of the sub-layer P21 are measured as maximum widths of the sub-layer P11 and the sub-layer P21 measured along the second direction D2 in a cross-sectional view. Similarly, the width WRR of the recessed region RR is measured as a maximum width of the recessed region RR measured along the second direction D2 in the cross-sectional view. It should be noted that, as mentioned above, when an outer surface SIL2 of an insulating film IL2 on a surface of the first conductive element E1 is a slope or an arc, an uppermost edge T of the outer surface SIL2 may be defined as an edge of the recessed region RR. In this case, the width WRR of the recessed region RR is a distance between uppermost edges T of two insulating films IL2 located on both sides of the recessed region RR in the cross-sectional view, respectively.

Based on the foregoing, in the embodiments of the disclosure, by means of the insulating layer, the use amount of the liquid crystal material can be reduced, or antenna performance can be less affected by temperature. In addition, the insulating layer is disposed outside the effective region, an influence of the insulating layer on the antenna performance can be reduced, or occurrence of a side effect can be reduced. In this way, the antenna device may have relatively stable performance. In some embodiments, the region in which the insulating layer is disposed or the area of the insulating layer is expanded to further reduce the use amount of the liquid crystal material.

The foregoing embodiments are merely intended for describing the technical solutions of the disclosure other than limiting the disclosure. Although the disclosure is described in detail with reference to the foregoing embodiments, persons of ordinary skill in the art should understand that they may still make combinations or modifications to the technical solutions described in the foregoing embodiments or make equivalent replacements to some technical features thereof, without departing from the scope of the technical solutions of the embodiments of the disclosure.

Although the embodiments and advantages of the disclosure have been disclosed above, it should be understood that, a person skilled in the art may make variations, replacements and modifications without departing from the spirit and scope of the disclosure, and features between various embodiments may be arbitrarily mixed and replaced with each other to generate other new embodiments. In addition, the protection scope of the disclosure is not limited to a process, machine, manufacturing, material composition, device, method, and step in a specific embodiment in this specification. A person skilled in the art may understand the existing or to-be-developed process, machine, manufacturing, material composition, device, method, and step from the content of the disclosure, which may be used according to the disclosure as long as the substantially same function can be implemented or the substantially same result can be obtained in the embodiments described herein. Therefore, the protection scope of the disclosure includes the foregoing process, machine, manufacturing, material composition, device, method, and step. In addition, each claim forms an independent embodiment, and the protection scope of the disclosure also includes a combination of claims and embodiments. The protection scope of the disclosure should be subject to the appended claims.

What is claimed is:

1. An antenna device, comprising:
   a first substrate;
   a first conductive element disposed on the first substrate to define, on the first substrate, a recessed region adjacent to the first conductive element;
   a second substrate facing the first substrate;
   a second conductive element disposed on the second substrate and located between the first substrate and the second substrate; and
   an insulating layer disposed between the first substrate and the second substrate, wherein
   in a top view of the antenna device, the second conductive element overlaps the first conductive element and the recessed region, and the insulating layer at least partially overlaps the recessed region.

2. The antenna device according to claim 1, further comprising an effective region, wherein in the top view of the antenna device, the effective region overlaps the first conductive element and the second conductive element, at least one edge of the effective region being separated from a corresponding edge of the second conductive element by a distance, and the insulating layer being located outside the effective region.

3. The antenna device according to claim 2, wherein the distance is in a range of 1 µm to 1000 µm.

4. The antenna device according to claim 2, wherein the insulating layer comprises a first part and a second part, wherein in the top view of the antenna device, the first part overlaps the recessed region, and the second part overlaps the first conductive element and is located outside the effective region.

5. The antenna device according to claim 4, wherein the first part and the second part are both disposed on the first substrate or the second substrate.

6. The antenna device according to claim 4, wherein the first part is disposed on one of the first substrate and the second substrate, and the second part is disposed on the other of the first substrate and the second substrate.

7. The antenna device according to claim 4, wherein at least one of the first part and the second part comprises two sub-layers, the two sub-layers being respectively disposed on the first substrate and the second substrate.

8. The antenna device according to claim 4, wherein in the top view of the antenna device, the first part overlaps the second conductive element.

9. The antenna device according to claim 1, further comprising an effective region, wherein in the top view of the antenna device, the second conductive element and the effective region are surrounded by at least a part of the insulating layer.

10. The antenna device according to claim 1, wherein the second conductive element traverses the recessed region.

11. The antenna device according to claim 1, wherein the insulating layer comprises an organic material.

12. The antenna device according to claim 1, wherein the insulating layer comprises an inorganic material.

* * * * *